United States Patent
Koto (10) Patent No.: US 7,075,982 B2
(45) Date of Patent: Jul. 11, 2006

(54) VIDEO ENCODING METHOD AND APPARATUS

(75) Inventor: Shinichiro Koto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 512 days.

(21) Appl. No.: 10/183,516

(22) Filed: Jun. 28, 2002

(65) Prior Publication Data

US 2003/0031251 A1    Feb. 13, 2003

(30) Foreign Application Priority Data

Jun. 29, 2001    (JP)    ............................. 2001-200158

(51) Int. Cl.
*H04N 7/12*    (2006.01)
(52) U.S. Cl. ............... 375/240.03; 382/239; 348/419.1
(58) Field of Classification Search ........... 375/240.03, 375/240.02, 240.08, 240.1; 382/236, 239; 348/419.1
See application file for complete search history.

(56) References Cited

U.S. PATENT DOCUMENTS

| | | | | |
|---|---|---|---|---|
| 6,310,915 B1 * | 10/2001 | Wells et al. | ........... | 375/240.03 |
| 6,490,320 B1 * | 12/2002 | Vetro et al. | ............ | 375/240.08 |
| 6,493,386 B1 * | 12/2002 | Vetro et al. | ............... | 375/240.1 |
| 6,574,279 B1 * | 6/2003 | Vetro et al. | ............ | 375/240.08 |
| 6,895,048 B1 * | 5/2005 | Boice et al. | ........... | 375/240.02 |

FOREIGN PATENT DOCUMENTS

| | | |
|---|---|---|
| JP | 8-186821 | 7/1996 |
| JP | 9-98427 | 4/1997 |
| JP | 10-126792 | 5/1998 |
| JP | 11-262003 | 9/1999 |
| JP | 2000-350211 | 12/2000 |

\* cited by examiner

*Primary Examiner*—Gims Philippe
(74) *Attorney, Agent, or Firm*—Oblon, Spivak, McClelland, Maier & Neustadt, P.C.

(57) ABSTRACT

A video encoding method includes executing a first encoding of encoding an input video signal in units of one frame, determining at least one of the number-of-bits allocation and a quantization scale allocation for each frame according to statistical data, determining a frame skip allocation showing presence of execution of a frame skip for each frame according to the statistical data, and executing a second encoding of encoding the input video signal according to at least one of the number-of-bits allocation and a quantization scale allocation and a frame skip allocation, to generate a bitstream.

20 Claims, 8 Drawing Sheets

VIDEO ENCODING METHOD AND APPARATUS

CROSS-REFERENCE TO RELATED APPLICATIONS

This application is based upon and claims the benefit of priority from the prior Japanese Patent Application No. 2001-200158, filed Jun. 29, 2001, the entire contents of which are incorporated herein by reference.

BACKGROUND OF THE INVENTION

1. Field of the Invention

The present invention relates to a video encoding scheme that encodes a video by at least two times of encoding, particularly a video encoding method and apparatus which analyzes statistical nature of an input video based on the first time encoding result, and performs the second time encoding based on the analysis result.

2. Description of the Related Art

The storage media from which variable bit rate data is readable and which is represented as DVD (Digital Versatile Disc) realizes video compression of high efficiency in a constant disc capacity by using video encoding of a variable bit rate in recording a video signal. For example, MPEG2 (Moving Picture Experts Group phase 2) video encoding scheme is adopted in the DVD.

Since entropy coding is used in MPEG2, the number of bits that is necessary for obtaining a constant picture quality varies according to resolution of an input video or speedy of movement thereof.

Therefore, varying the bit rate according to nature of the video enables to lower an average bit rate in comparison with encoding of a constant bit rate, resulting in reducing the total number of bits.

In a video encoding used for recording video data on a storage media such as the DVD, so-called 2 path encoding to encode the video data two times is performed in order to realize the most suitable bit allocation On Jpn. Pat. Appln. KOKAI Publication No. 8-186821, for example, is disclosed a technique that acquires statistical data in units of one frame by first time encoding, allocates the number of bits in units of one frame over the whole video sequence based on the statistical data, and performs the second time encoding with a variable bit rate.

A MPEG 4 (Moving Picture Experts Group phase 4) video encoding scheme which is directed to encoding a video signal with a bit rate lower than a recording bit rate of DVD for video transmission in an internet and a mobile terminal is standardized in 1999. MPEG 4 is a video encoding scheme providing with various functionality expansions, such as enhancement of compression efficiency, reinforcement of error resilience, various functionality expansions representative of object encoding, in comparison with MPEG 2. MPEG 2 is based on encoding at a constant frame rate assuming a television signal and a cine film. In contrast, MPEG 4 enables encoding at an arbitrary frame rate by using a frame skip in order to realize encoding of a low bit rate.

The picture quality under the same average bit rate is greatly influenced by how a frame rate is controlled in dynamic in the MPEG 4 video encoding scheme. A method of encoding the video by detecting presence of movement of the input image beforehand and changing a frame rate every scene as described in Jpn. Pat. Appln. KOKAI Publication No. 2000-350211, for example, is known.

It is required in MPEG2 and MPEG 4 video encoding schemes to encode video data with such rate control that underflow and overflow of a buffer do not occur in a receiving buffer model in a virtual decoder as referred to as VBV (Video Buffering Verifier). However, Jpn. Pat. Appln. KOKAI Publication No. 2000-350211 does not consider administration of VBV.

Further, the operation of VBV is a buffer variable model to perform in units of a frame. Therefore, it is necessary for realizing allocation of the number of bits for the control of VBV and the high efficient encoding to estimate in precision the number of generated bits in units of one frame. In MPEG2 and MPEG 4, if a frame skip is performed, an interframe predictive coding is executed. For this reason, the frame interval between a prediction picture and a reference picture increases, and the prediction efficiency degrades, resulting in degrading the coding efficiency often. Therefore, it become difficult to predict the number of generated bits in the second encoding in the first encoding, if the position of frame skip differs between the first encoding and the second encoding.

As describe above, the video encoding technology based on the conventional 2 path encoding has a problem making difficult to allocate the optimum number of bits in accuracy under VBV administration, when the interframe predictive coding of variable frame rate is performed in the second encoding.

It is an object of the present invention to provide a video encoding method of encoding a video at high efficiency by 2 path encoding that can allocate the optimum number of bits in an interframe predictive coding of a variable frame rate and an apparatus therefor.

It is another object of the present invention to provide a video encoding method enabling an accurate VBV administration and allocation of the optimum number of bits in 2 path encoding.

BRIEF SUMMARY OF THE INVENTION

According to the first aspect of the invention, there is provided a video encoding method of encoding a video comprising: executing a first encoding of encoding an input video signal in units of one frame at a constant frame rate to generate statistical data including the number of generated bits for each frame; determining at least one of an allocation of the number of bits and an allocation of a quantization scale to each frame; determining a frame skip allocation for a frame to be skipped for each frame according to the statistical data; and executing a second encoding of encoding the input video signal according to at least one of the allocation of the number-of-bits and the allocation of the quantization scale, and the frame skip allocation to generate a bitstream.

According to the second aspect of the invention, there is provided a video encoding method of encoding a video by encoding an input video signal a plurality of times, the method comprising: executing a first encoding of encoding the input video signal at a constant bit rate; generating statistical data including the number of generated bits for each frame in the first encoding; determining at least one of the number of bits and a quantization scale that are to be allocated to each frame, and a frame to be skipped; and executing a second encoding of encoding the input video signal according to at least one of the number of bits and the quantization scale, and the frame to be skipped.

According to the third aspect of the invention, there is provided a video encoding apparatus which encodes an input video signal, comprising: an encoder which encodes the input video signal in units of one frame, and generates statistical data including the number of generated bits every frame when the encoder encodes the input video signal at a constant frame rate; a first determination part which determines at least one of an allocation of the number of bits and an allocation of a quantization scale for each frame according to the statistical data; and a second determination part which determine a frame skip allocation for a frame skip for each frame according to the statistical data, the encoder outputting a bitstream as coded data when the encoder encodes the input video signal according to the frame skip allocation and at least one of the allocation of the number-of-bits and the allocation of the quantization scale.

DETAILED DESCRIPTION OF THE INVENTION

There is now be described an embodiment of the present invention referring to drawings.

Figure 1:
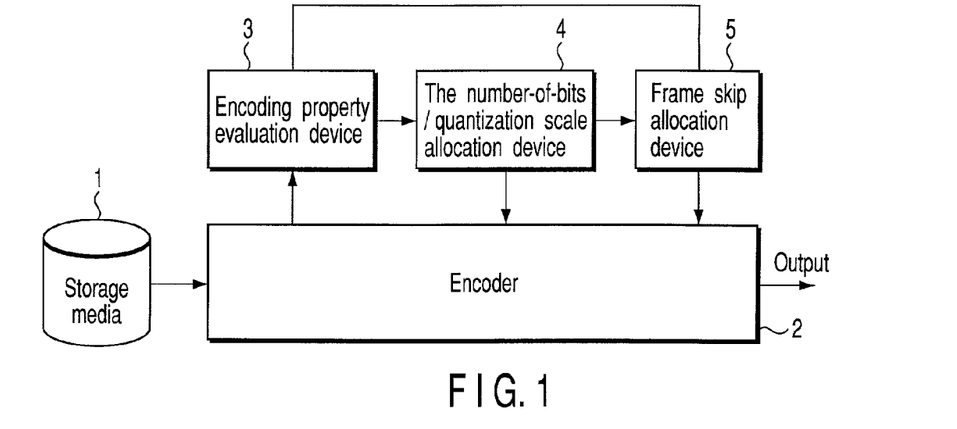
FIG. 1 shows a block diagram of a schematic configuration of a video encoding apparatus according to an embodiment of the present invention.

FIG. 1 is a block diagram showing a schematic configuration of a video coding apparatus according to an embodiment of the present invention. This video encoding apparatus may be realized by hardware, but one part or all thereof may be realized by software that is executed by a computer.

In FIG. 1, a storage media 1 is, for example, a hard disc and a digital VTR. The motion picture signal (video signal) reproduced from the storage media 1 is input as a picture signal to be encoded (input video signal) to an encoder 2. The encoder 2 comprises a video encoder based on MPEG 4, for example, (MPEG 4 encoder). The encoder 2 generates encoded data by encoding twice the input video signal of the same video sequence reproduced repeatedly from the storage media 1.

In the encoder 2, the statistical data that reflects an encoding property every frame of the input video signal in the first encoding is extracted. This statistical data is input to an encoding property evaluation device 3. The encoding property evaluation device 3 estimates the encoding property of the encoder 2 to be described below based on the input statistical data.

Based on the encoding property estimated by the encoding property evaluation device 3, at least one of allocation of the number of bits and allocation of quantization scale is performed for each frame by a number-of-bits/quantization scale allocation device 4. In other words, the number-of-bits allocation or quantization scale or both are determined for each frame when the encoder 2 encodes the input video signal 1.

Furthermore, based on the encoding property estimated by the encoding property evaluation device 3, a frame skip allocation representing presence of execution of frame skip of each frame is performed by a frame skip allocation device 5. In other words, in the frame skip allotment device 5, presence of the frame skip of each frame when the encoder 2 performs the second encoding is determined.

Based on at least one of the number-of-bits allocation and the quantization scale that are determined every frame, and the frame skip allocation, the encoder 2 performs the second encoding. The bitstream generated by the encoder 2 in the second encoding is output as conclusive coded data from the video encoding apparatus.

Figure 2:
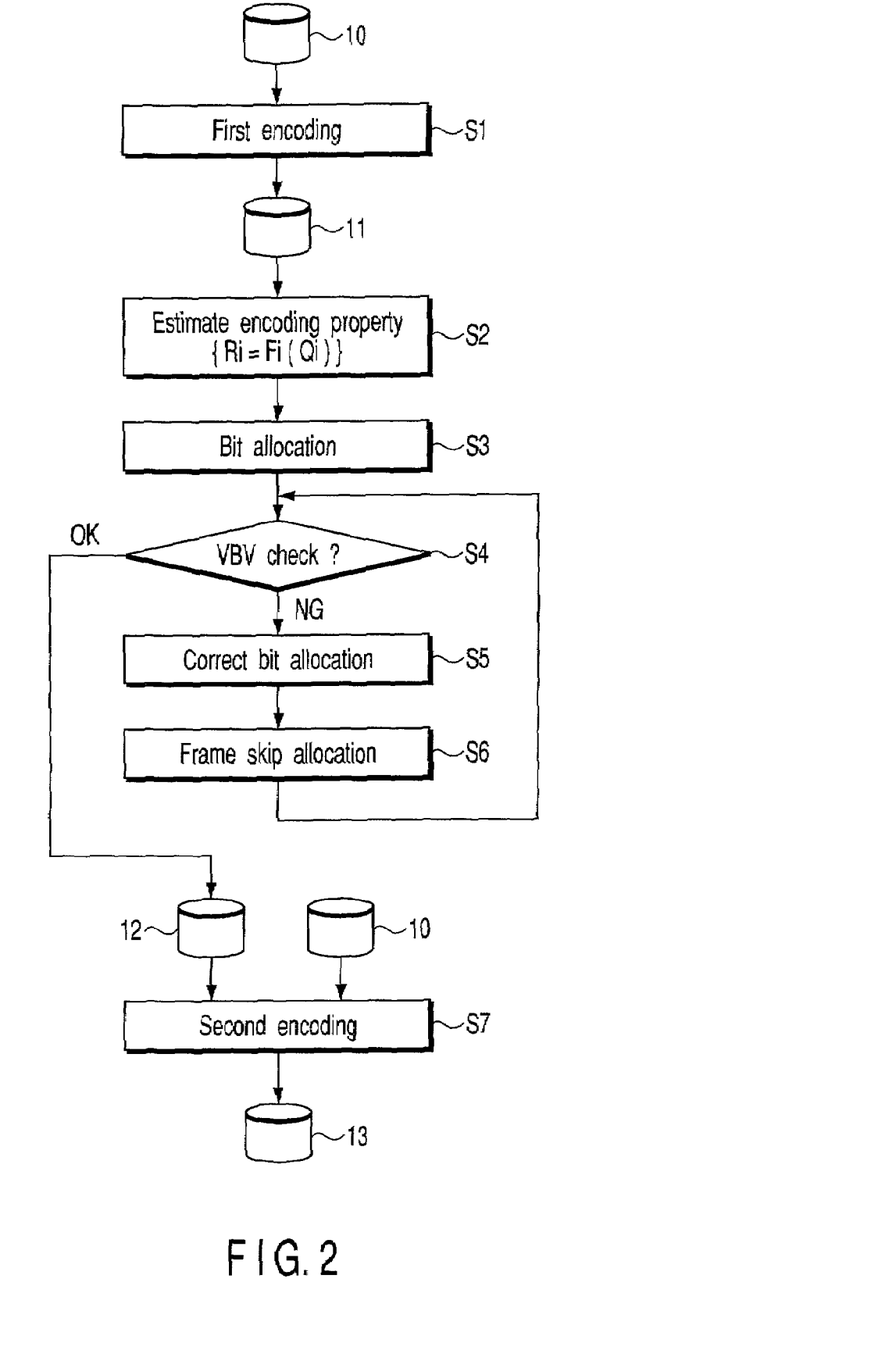
FIG. 2 shows a flowchart of routine of the video encoding according to the embodiment.

A schematic process in the present embodiment is described according to the flowchart shown in FIG. 2. Although determining only the number-of-bits allocation among the number-of-bits allocation and quantization scale allocation for each frame is described in the present embodiment, the quantization scale allocation every frame instead of the number-of-bits allocation every frame may be determined or both of the number-of-bits allocation and the quantization scale allocation may be determined.

At first, the first encoding is subjected to an input video signal 10 to be encoded (step S1). The first encoding is directed to collecting statistical data 11 representing an encoding property every frame of the input video signal 10. The first encoding encodes the input video signal at a constant frame rate using a constant quantization scale, for example, and a standardized video-encoding scheme of MPEG 4, for example. Assuming that the statistical data 11 includes information of the quantization scale of each frame and information of the number of generated bits.

An encoding property is estimated from the statistical data 11 generated in the step S1 (step S2). The encoding property is a function to express a relation between the number of generated bits and quantization scale every frame, for example. Parameters of the function are generated in step S2.

Using the parameters of encoding property provided in step S2, the number-of-bits allocation every frame is performed over the whole video sequence, that is, the whole of a sequence of input video signal 10 (step S3). This number-of-bits allocation is performed so that a uniform picture quality is obtained under a given average bit rate. Under the number of bits allocated by step S3, the condition of VBV (Video Buffering Verifier) (step S4) is checked. The VBV is a virtual decoder model defined by MPEG video encoding as known already. In a receiving buffer (VBV buffer) model in the virtual decoder, the burst of the number of generated bits must be limited so that underflow and overflow do not occur.

MPEG video encoded data is obliged to meet the VBV model in standard. The arbitrary number-of-bits allocation results in unsatisfying the condition of VBV. In this case, the correction (bit allocation correction) on the number-of-bits allocation performed in step S3 after step S4 is performed (step S5). Further, the insertion of frame skip (frame skipping), that is, the frame skip allocation is performed according to need (step S6). The steps S5 and S6 are repeated till the condition of VBV is satisfied.

After correction of the number-of-bits allocation that a VBV condition is satisfied and the allocation of frame skip is completed, the second encoding is performed for the same video signal 10 as that subjected to the first encoding, using the number-of-bits allocation/frame skip allocation data 12 representing the results of the number-of-bits allocation performed in step S3 (the number-of-bits allocation after correction when the number-of-bits allocation is corrected in step S5) and the frame skip allocation performed in step S6 (step 7).

The second encoding uses the encoding scheme basically same as the first encoding. However, in the second encoding, the rate control is performed according to the number-of-bits allocation/frame skip allocation data 12 so that the number of generated bits becomes the given number of bits. Further, the frame skip process is performed appropriately. Optimized coded data 13 is output by the second encoding.

Figure 3A:
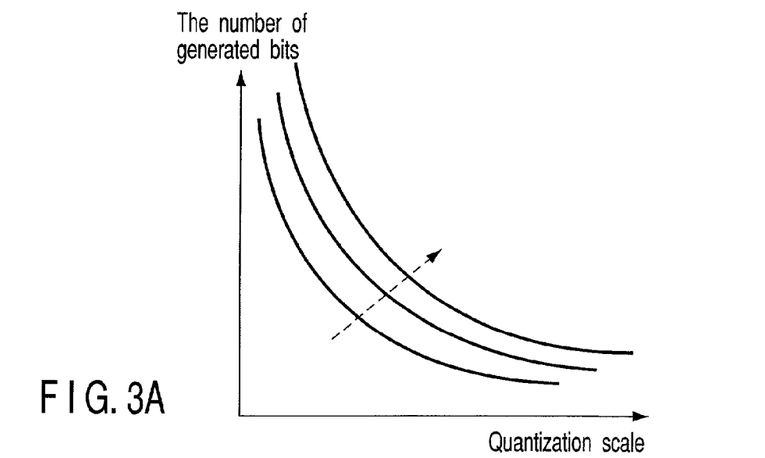
FIGS. 3A and 3B show diagrams for explaining an encoding property of a video.
Figure 3B:
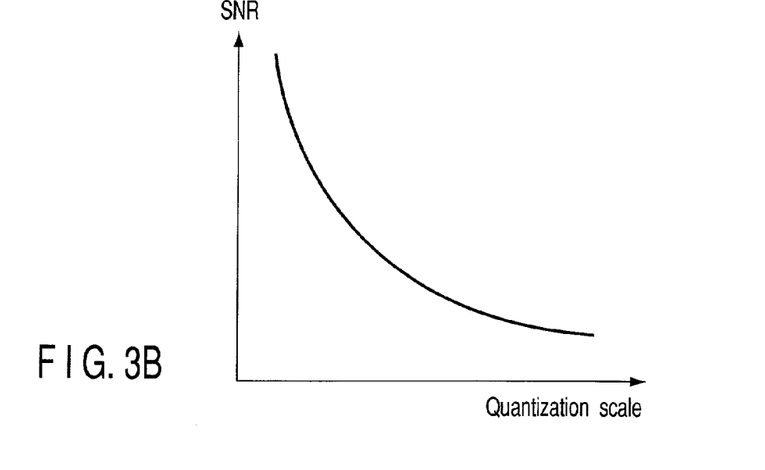

The process of the encoding property evaluation step (S2) in FIG. 2 (S2) will be concretely descried referring to FIGS. 3A and 3B.

Generally, control of the number of generated bits is performed by adjustment of a quantization scale since the number of generated bits of the encoded video data varies according to the quantization scale. FIG. 3A shows a graph representing a relation between the quantization scale and the number of generated bits. The quadrature axis indicates the quantization scale, and the axis of ordinate shows the number of generated bits. The relation between the number of generated bits and the quantization scale varies according to every picture, that is, the nature of the picture. The encoding property varies in a direction shown by a dashed arrow in FIG. 3A, for example, according to increase of the resolution of the picture or intensity of variation of the picture. The encoding property shown in FIG. 3A is obtained in the encoding property evaluation step (S2).

FIG. 3B shows a relation between the quantization scale and signal-to-noise ratio of a decoded playback video signal. The decoded playback video signal is a video signal obtained by decoding the video encoded data generated by the video encoding apparatus by means of a video decoding apparatus. In encoding with quantization such as MPEG video encoding, coding distortion increases according to incrementation of the quantization scale, the SN ratio of the decoded playback video signal decreases. The encoding distortion is determined in uniqueness by the quantization scale, and is not dependent upon the nature of picture. In a case of using quantization weight in consideration of visual sensitivity (quantization step size fluctuates every spatial frequency), the encoding distortion is not always restricted to the above, but generally the SN ratio decreases flatly for the quantization scale.

Therefore, an uniform quantization scale obtained by suppressing the variation of the quantization scale should be preferably used in order to obtain a stable playback picture quality over the whole video sequence. However, if the quantization scale is constant, the number of generated bits every frame varies according to the nature of picture as described above.

It is necessary to obtain periodically the encoding property shown in FIG. 3A every frame, for example, in order to suppress the variation of the quantization scale and encode the video data at a given bit rate. The encoding property, namely the relation between the number of generated bits and the quantization scale can be approximated by exponential function and function of high order. An example approximating the encoding property by the following equation will be described as the simplest example.

$$Ri = Ai \times Q^{-1} + Bi \quad (1)$$

In an equation (1), Ri is the evaluation number of generated bits of the i-th frame, and Ai and Bi are parameters indicating the encoding property of the i-th frame, and Q is a quantization scale. Ai indicates an encoding difficulty degree to express a degree to complicate the encoding, the larger the encoding difficulty degree is, the larger the number of generated bits in a case of using the same quantization scale becomes. Bi is an item indicating the constant number of bits that is not dependant upon the quantization scale, and indicates the fixed number of bits such as header parts.

The first encoding can determine parameters Ai and Bi in the equation (1) every frame by encoding the video data using a constant quantization scale every frame, and separating the encoded video data into a part affected by quantization of the number of generated bits every frame and a part not affected by quantization of a header and the like and totalizing them.

There will be described in detail the number-of-bits allocation step (S3) in FIG. 2 referring to FIGS. 4A to 4C and 5A to 5C. The number-of-bits control in the video encoding such as MPEG video encoding can classify in a constant bit rate (CBR) encoding and a variable bit rate (VBR) encoding. It is necessary to make the number of bits constant by changing the quantization scale in order to encode data with a constant bit rate in the CBR encoding. The picture quality varies as the quantization scale changes. Generally, the high resolution video with high encoding difficulty degree (Ai) or the video with speedy movement decreases in picture quality.

Figure 4A:
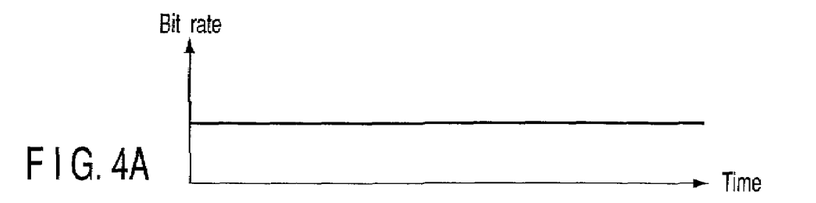
FIGS. 4A, 4B and 4C show diagrams for explaining an encoding property of a constant bit rate encoding.
Figure 4B:
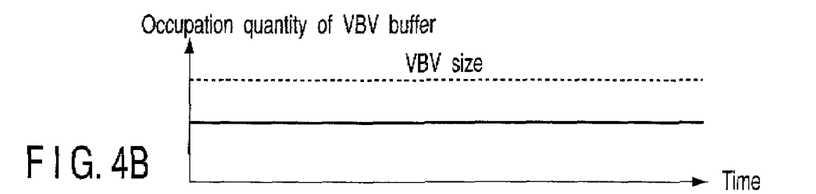
Figure 4C:
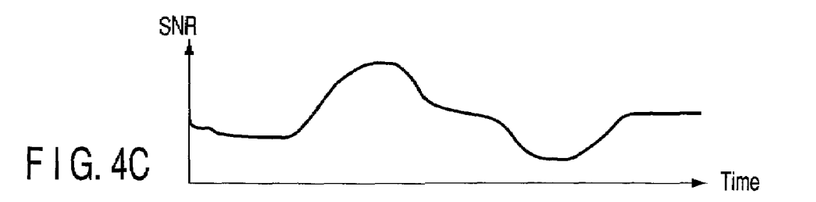

FIGS. 4A, 4B, and 4C show the variation of bit rate in CBR, the variation of occupation quantity of VBV buffer, and the variation of SN ratio. The variation of the bit rate and occupation quantity of the VBV buffer becomes very small, in reverse, the SN ratio, that is, picture quality varies according to a change of nature of the picture.

Figure 5A:
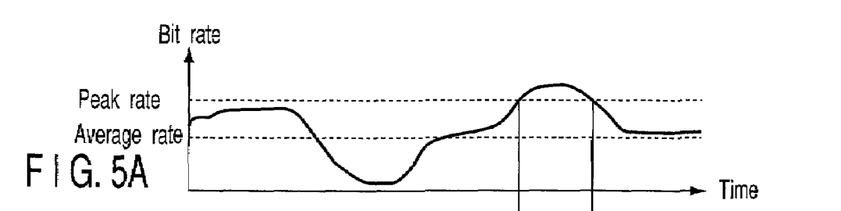
FIGS. 5A, 5B and 5C show diagrams for explaining an encoding property of a variable bit rate encoding.
Figure 5B:
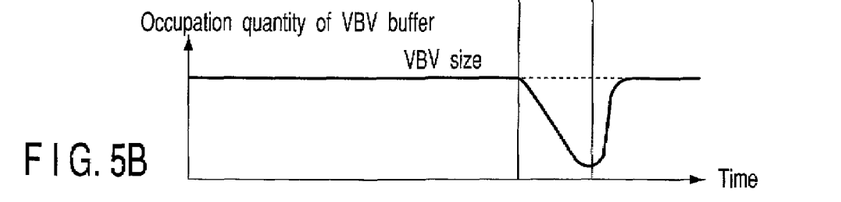
Figure 5C:
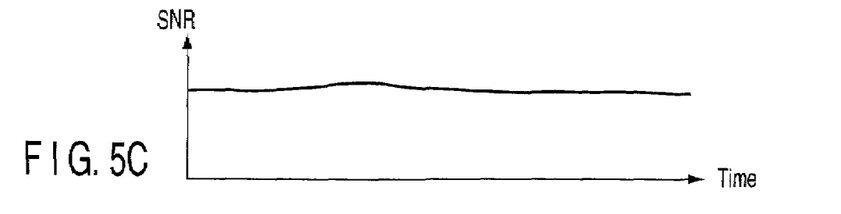

On the other hand, FIGS. 5A, 5B, and 5C show the variation of the bit rate in VBR, the variation of occupation quantity of the VBV buffer and the variation of SN ratio. In VBR, it is found that the variation of SN ratio becomes small, and making the bit rate vary according to nature of the picture provides a stable picture quality.

Further, in a VBV model in the MPEG video encoding, it is possible to encode data at a bit rate at a moment which it goes beyond a peak rate within a range of a bit rate capable of absorbing by the VBV buffer. In a part going beyond the peak rate, the occupation quantity of VBV buffer shifts on the underflow side. When this period continues for a long time, the VBV buffer becomes underflow and fails.

The number-of-bits allocation step (S3) of FIG. 2 in VBR, the VBV check step (S4), the number-of-bits allocation correction step (S5), and the frame skip allocation step (S6) will be concretely described hereinafter. Though VBR is explained here, the present invention is not limited to VBR, and can apply to 2-path CBR encoding by executing a sequence of process steps according to VBV model of CBR.

In a case of VBR, it is possible to greatly vary the number-of-bits allocation within a range of constraint of the bit rate and constraint of VBV in correspondence with the nature of picture. At first, the number-of-bits allocation step (S3) determines a constant quantization scale over the whole video sequence, and then determines the number-of-bits allocation for each frame so that the total number of bits correspond to the number of bits obtained by a predetermined average bit rate and a total time for a video sequence, using the encoding property of each frame which is provided by the encoding property evaluation step (S2).

Next, a temporal change of occupation quantity of VBV buffer under this number-of-bits allocation is computed according to the VBV model defined by MPEG video standard. In the VBV check step (S4), whether the VBV buffer causes underflow (a quantity of buffer occupation is less than zero) is determined. If the underflow does not occur, the number-of-bits allocation is finished and the frame skip is not executed. When VBV underflow occurs, the number-of-bits allocation correction of step S5 and the frame skip allocation of step S6 are executed according to the following procedure.

FIGS. 6A to 6C and 7A to 7D show examples of temporal changes of the occupation quantity of buffer of the VBV model in VBR. The quadrature axis expresses the frame number, and the axis of ordinates the occupation quantity of a buffer. This is a model wherein data corresponding to the number of generated bits are instantly extracted from the buffer and decoded for each frame, and the buffer is filled with the encoded data at the peak rate only during a time interval corresponding to a frame interval between the frames. Further, this shows a model wherein the overflow of the buffer does not occur in the VBV model of VBR and a data transfer is stopped at a time point when the VBV buffer reaches the maximum value.

Figure 6A:
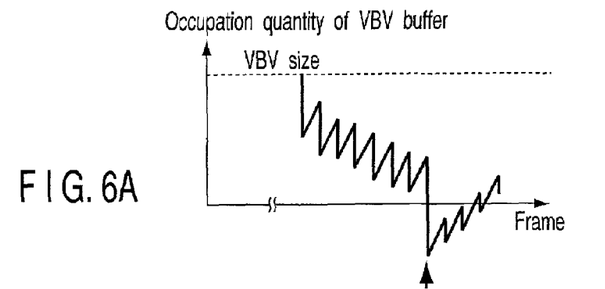
FIGS. 6A, 6B and 6C show diagrams for explaining the number of bits and a frame skip allotment in the embodiment.

FIG. 6A shows an example that underflow of the buffer occurs on the way. If the second encoding is performed with allocation of the number of bits as it is, the encoded data violates VBV. For this reason, the number of bits allocation is revised.

Figure 6B:
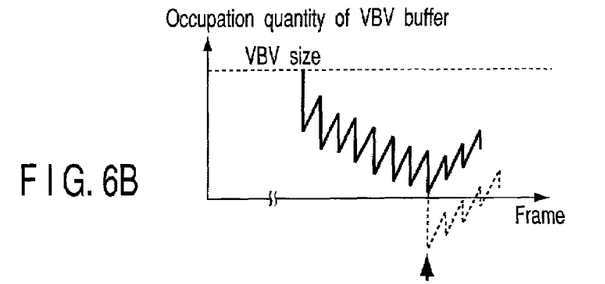

FIG. 6B shows an example wherein the number of bits allocation to the frame that underflow occurs first is cancelled. When underflow of the buffer is avoided by this cancellation, a correction process of the number-of-bits allocation is finished. The reduction of the number-of-bits allocation is estimated by gradually increasing the quantization scale for an appropriate frame from a quantization scale provided by the number-of-bits allocation step (S3), and estimating a reduction quantity of the number of bits from the encoding property of the appropriate frame obtained by the encoding property evaluation step (S2). However, if the quantization scale is largely increased, the picture quality of the frame deteriorates largely. For this reason, the upper limit of quantization scale is set to a value that is not beyond a value within a predetermine range using as a criteria a quantization scale obtained by the number-of-bits allocation step (S3). As a result, it is possible to restrain a sudden degradation of the picture quality due to the constraint of VBV.

Figure 6C:
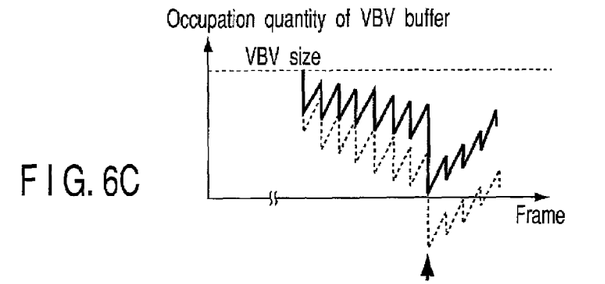

FIG. 6C shows a method of correcting the number-of-bits allocation, that is different from that shown in FIG. 6B. FIG. 6C shows an example to prevent underflow by canceling the number-of-bits allocation in all frames between the frame that occupation of VBV buffer occupation becomes maximum and the frame that underflow occurs. In this case, since the quantity of correction of the number-of-bits allocation for each frame is held to a minimum, it is possible to make the variation of the picture quality that occurs due to constraint of VBV small in comparison with the case of FIG. 6B.

Figure 7A:
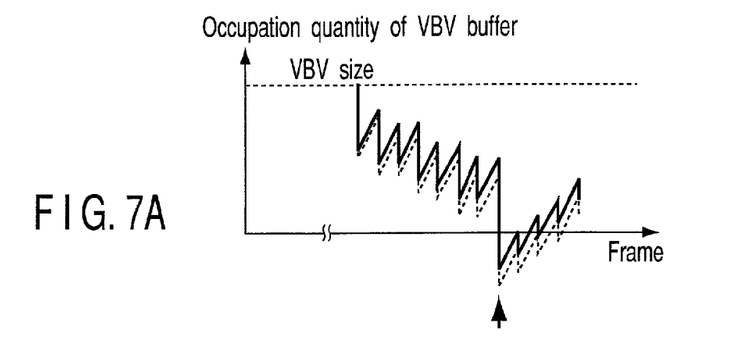
FIGS. 7A, 7B, 7C and 7D show diagrams for explaining the number of bits and a frame skip allotment in the embodiment.

FIG. 7A shows an example wherein underflow cannot be avoided by a time period to the upper limit of the quantization scale, although the number-of-bits allocation to prevent underflow of the VBV buffer is corrected by the process of FIG. 6C. In this case, the underflow of the VBV buffer is avoided by inserting the frame skip by the frame skip allocation step S6.

Figure 7B:
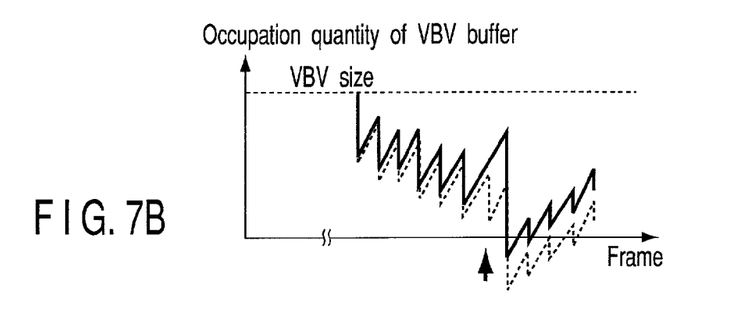
Figure 7C:
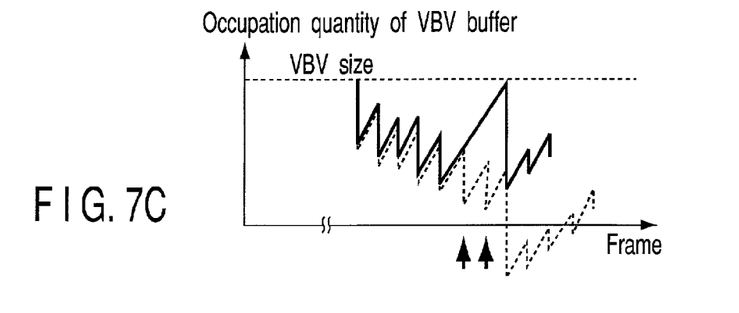

The example of FIG. 7A cannot avoid underflow only by skipping 1 frame as shown in FIG. 7B. In this case, VBV underflow is avoided by skipping plural frames (2 frames in this embodiment) as shown in FIG. 7C. However, when continuous plural frames are skipped as shown in FIG. 7C, the frame rate degrades locally largely, resulting in the video of rough movement.

Figure 7D:
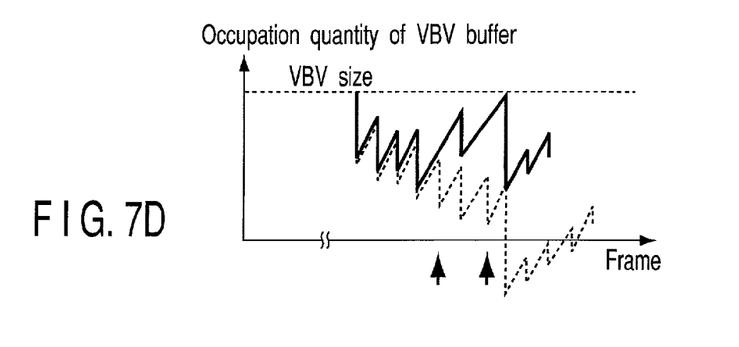

Thus, underflow frames are intermittently skipped as shown in FIG. 7D without skip of a sequence of frames. As a result, it is possible to suppress that the frame rate degrades locally largely, and to prevent VBV underflow while keeping natural movement.

Figure 8:
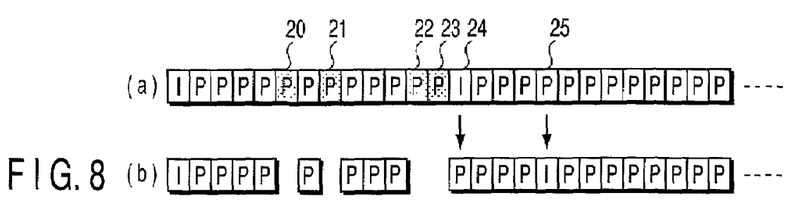
FIG. 8 is a diagram for explaining one example of a change of a prediction structure according to the frame skip of a P picture in the embodiment.

By the way, when frame skip is executed in the second encoding in order to satisfy limit of VBV as described above, the prediction structure of an interframe prediction in the second encoding often varies to a structure different from that of the first encoding, and the precision of encoding property obtained by the encoding property evaluation step (S2) often degrades in the second encoding. FIG. 8 shows an example of a change of prediction structure by the frame skip, wherein (a) shows a picture type of each frame in the first encoding, and (b) show a picture type of each frame in the second encoding. The picture type is an encoding type indicating a kind of encoding in the predictive coding. I represents a frame for an intraframe encoding (I picture), and P represents a frame for a forward prediction encoding (P picture).

In the example of FIG. 8, the frames of reference numbers 20–23 among the frames of the input video signal shown by (a) in FIG. 8 and subjected to the first encoding are allocated as skip frames, and skipped in the second encoding as shown by (b) in FIG. 8. Generally, I pictures are provided every number of fixed frames to be encoded. In the embodiment, I pictures are provided at the rate of once every 13 frames to be encoded in the first encoding and the second coding.

In this case, the position of a frame to be encoded as I picture differs between the first encoding and the second encoding according to the number of frames to be skipped. In other words, mismatch occurs in picture type between the first encoding and the second encoding due to frame skip. In the example of FIG. 8, mismatch of a picture type occurs between the first encoding and the second encoding in frames 24 and 25. Since the encoding property is largely different between I picture and P picture, such mismatch of a picture type complicates to estimate correctly the number of bits using the encoding property obtained by the encoding property evaluation step (S2) in FIG. 2, resulting in difficulty in optimization of the number-of-bits allocation.

Figure 9:
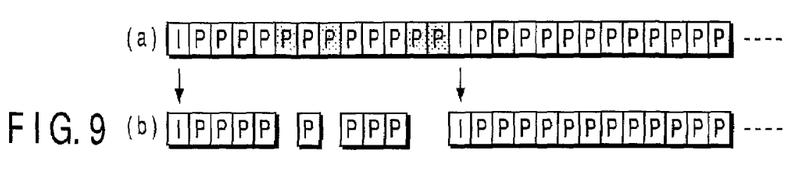
FIG. 9 is a diagram for explaining another example of a change of a prediction structure according to a frame skip of a P picture in the embodiment, which makes a picture type of each frame coincide between the first encoding and the second encoding.

For this problem, the first picture type of each frame is coincided between the first encoding and the second encoding regardless of frame skip as shown in FIG. 9. As a result, the degradation of evaluation precision of encoding property with mismatch of a picture type can be suppressed.

Figure 10A:
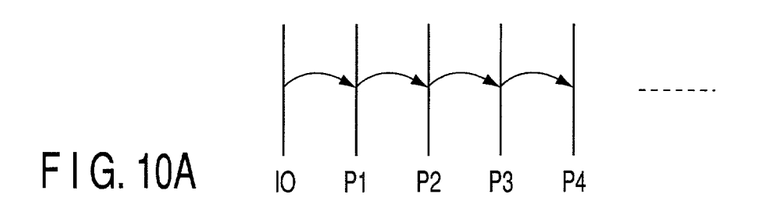
FIGS. 10A, 10B and 10C are diagrams for explaining a change of a interframe prediction relation according to a frame skip of P picture in the embodiment.
Figure 10B:
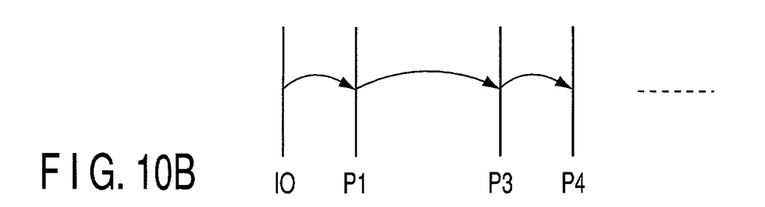
Figure 10C:
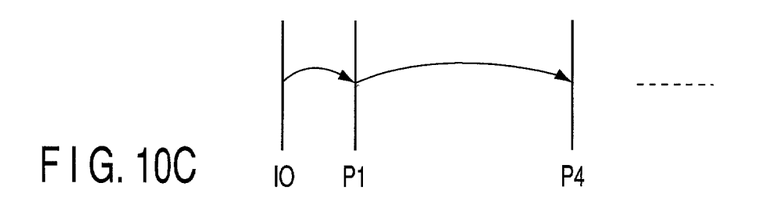

However, if the picture type of each frame is coincided between the first encoding and the second encoding as shown in FIG. 9, the relation between the reference picture and the picture in the interframe prediction to be encoded is often varied. FIGS. 10A to 10C show a change of an interframe prediction with frame skip of P picture. FIG. 10A shows encoding at a constant frame rate, and the first encoding is carried out by this prediction structure. The arrow indicates a relation between the reference picture and the picture to be encoded in an interframe prediction.

FIG. 10B shows an example wherein the frame P2 of FIG. 10A is skipped in the second encoding. The picture P3 to be encoded is encoded using P2 as the reference picture in the first encoding, and Pi as the reference picture in the second encoding.

FIG. 10C shows an example wherein the frames P2 and P3 shown in FIG. 10A are skipped. The picture P4 to be encoded is encoded using P3 as the reference picture in the first encoding, and Pi as the reference picture in the second encoding.

Generally, the prediction efficiency decreases as the distance between frames of the reference picture and the picture to be encoded increases, so that the number of generated bits increases for the same quantization scale. Furthermore, the prediction efficiency degrades largely if a scene change point is included in the skipped frames.

Figure 11A:
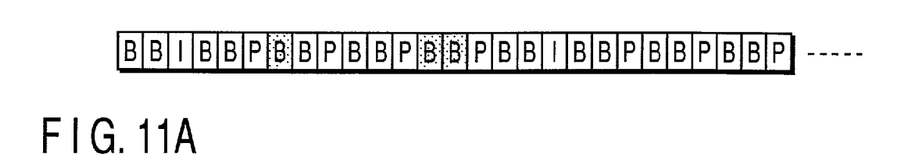
FIGS. 11A and 11B shows diagrams for explaining a change of a interframe prediction structure according to the frame skip of B picture in the embodiment.
Figure 11B:
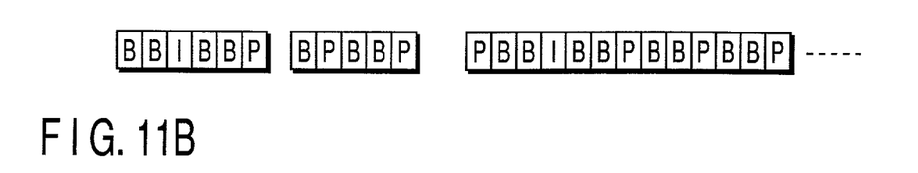

On the other hand, when bi-directional predictive encoding pictures (B pictures) are included in the picture to be encoded as shown in FIG. 11A, the B picture itself is not used as the reference picture. Therefore, if skip frames are selected from the frames encoded as B picture as shown in FIG. 11B, the prediction structure of the frames encoded in the second encoding coincides with that of the first encoding as shown in FIGS. 12A to 12C.

Figure 12A:
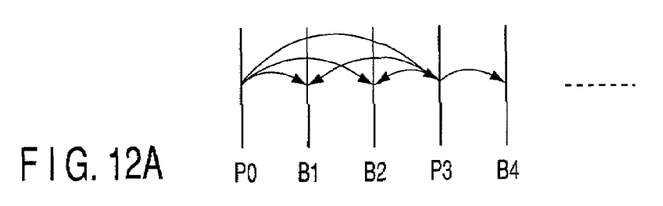
FIGS. 12A, 12B and 12C show diagrams for explaining a change of a interframe prediction relation according to the frame skip of B picture in the embodiment.
Figure 12B:
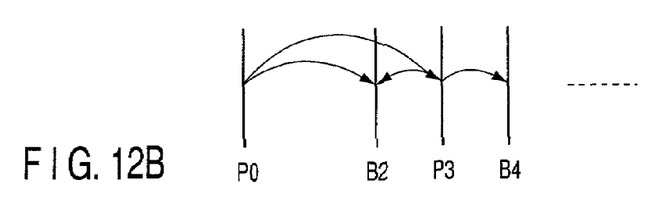
Figure 12C:
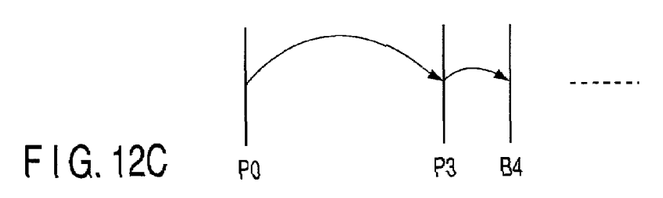

In other words, FIG. 12A shows encoding of a constant frame rate, and the first encoding is carried out according to this prediction structure. FIG. 12B shows an example wherein the frame B1 in FIG. 12A is skipped in the second encoding. FIG. 12C shows an example wherein the frames B1 and B2 in FIG. 12A are skipped. The prediction structure in the second encoding of FIGS. 12B and 12C is the same as that of the first encoding of FIG. 12A. Therefore, the encoding property obtained by the encoding property evaluation step (S2) in FIG. 2 can use without correcting regardless of the frame skip.

When degradation of the prediction efficiency occurs with the frame skip as described referring to FIGS. 9 and 10A to 10C, the precision of encoding property obtained by the encoding property evaluation step (S2) degrades, resulting in difficulty in optimization of the number-of-bits allocation in consideration of VBV. Thus, the encoding property is corrected according to the following procedure.

Figure 13:
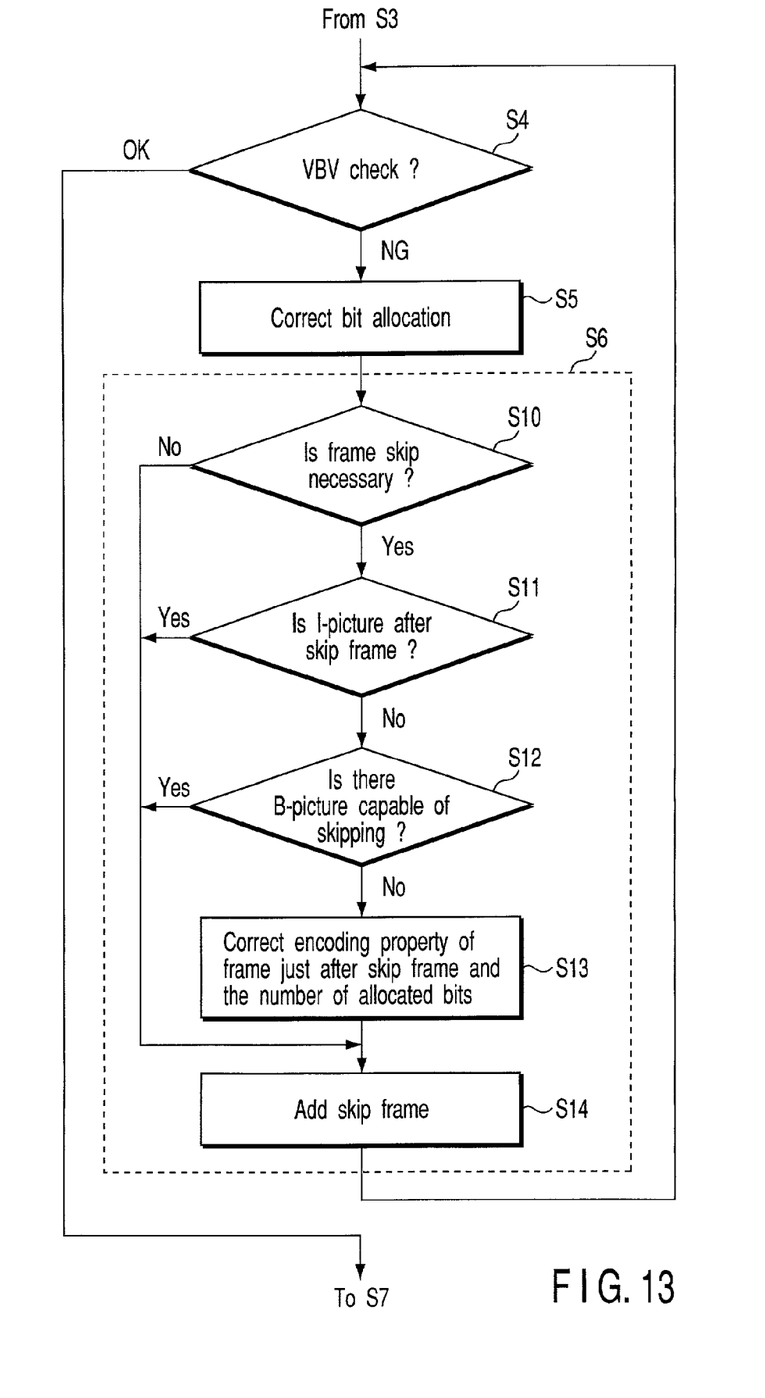
FIG. 13 shows a flowchart of procedure of a correction process of encoding property according to a frame skip in the embodiment.

FIG. 13 shows a flowchart of procedure of correction of frame skip and an encoding property correction. FIG. 13 shows in detail the process of the frame skip allocation step (S6) of FIG. 2.

When the underflow of VBV is estimated by the VBV check step (S4), whether the underflow of VBV is improved by step S10 is checked, that is, the necessity for frame skip is checked after having corrected the number-of-bits allocation by the number-of-bits allocation correction step (S5) as described above. When VBV underflow is not improved, the need for the frame skip is determined, and the frame to be skipped is determined.

When a frame encoded without being skipped just after the frame to be skipped in the second encoding is I picture (Yes in step S11), the difference between the interframe prediction structures of the first encoding and the second encoding due to the frame skip does not occur in the second encoding. Therefore, a skip frame is added (S14) and the correction of the encoding property is not performed. Further, when the B picture capable of skipping exists ahead of the VBV underflow evaluation frame (S12), the corresponding B picture is determined as a skip frame. In this case, since a difference does not occur between the interframe prediction structures, the correction of encoding property is not performed. If no B picture capable of skipping exists, the encoding property and the number of allocated bits of the frame just after the skip frame are corrected (S13).

On the other hand, when a reference picture for a frame to be encoded just after the skip frame differs from the reference picture in the first encoding due to the frame skip in the second encoding, as shown in FIGS. 10A to 10C, encoding property parameters are corrected as described hereinafter. Further, the number-of-bits allocation for the frame to be encoded is corrected according to the correction of the encoding property parameters.

There will now be described a method of correcting the encoding property parameters in the example of FIGS. 10A to 10C.

As mentioned above, Ai in the equation (1) shows the encoding difficulty degree of an i-th frame. Ai is affected by the interframe prediction efficiency when the i-th frame is an interframe predictive coding frame (P picture or B picture). The scene change point can be detected by watching a temporal change of Ai. For example, assuming that the encoding difficulty degrees Ai in frames P1, P2, and P3 are A1, A2, and A3 in FIG. 10A, respectively. When the value of A2 is very large in comparison with values of A1 and A3, it can be supposed that the scene is changed between P1 and P2. In this case, the frame P1 as a reference picture for P3 in FIG. 10B or P4 in FIG. 10C becomes an image of a scene different from the frame P3 or P4 to be encoded. For this reason, it is predicted that the encoding efficiency decreases.

As thus described, when the scene change point is included between a frame to be encoded just after the skip frame and a reference picture, as a result of frame skip, the encoding property parameter in a frame just after the scene change point is used as an encoding property parameter of the frame to be encoded just after the skip frame. In the example of FIGS. 10A to 10C, the encoding property parameter of P2 is used as the encoding property parameter of P3 in FIG. 10B or P4 in FIG. 10C. As thus described, by correcting the encoding parameter in consideration of the scene change, degradation of evaluation precision of the encoding property can be suppressed. As a result, it is possible to perform effective number-of-bits allocation.

If a distance between the frames of a reference picture and a picture to be encoded increases when continuous frame skips include no scene change, the prediction efficiency generally decreases unless the picture to be encoded is a completely still picture. Thus, when the frame skips include no scene change, encoding properties are corrected as follows.

Assuming that the n-th frame is an picture to be encoded just after the frame skip, and the encoding property parameters represented by the equation (1) regarding the frame are An and Bn. Further, assuming that the encoding property parameters of I picture most near to the n-th frame in time are AnI and BnI. Furthermore, assuming that the number of continuous frame skips just before the n-th frame is r. The encoding property parameters of the n-th frame are corrected as shown in the following equation according to these parameters.

$$A'_n = A_n + \max(0, A_{nI} - A_n) \times \left(1 - \frac{1}{1 + K \times r^2}\right) \quad (2)$$

$$B'_n = B_n$$

$A_n'$ and $B_n'$ are encoding property parameters after correction. K is a constant. In the equation (2), the parameter $A_n'$ representing the encoding difficulty degree among these parameters coincides with $A_n$ in a case of that there is no frame skip, that is, r=0. Further if the number of frame skips increases, the parameter $A_n'$ decreases in inverse proportion to square of the distance between frames of a picture to be encoded and a reference picture, and converges to the encoding difficulty degree $A_{nI}$ of adjacent I picture when the distance between frames is infinity.

Figure 14:
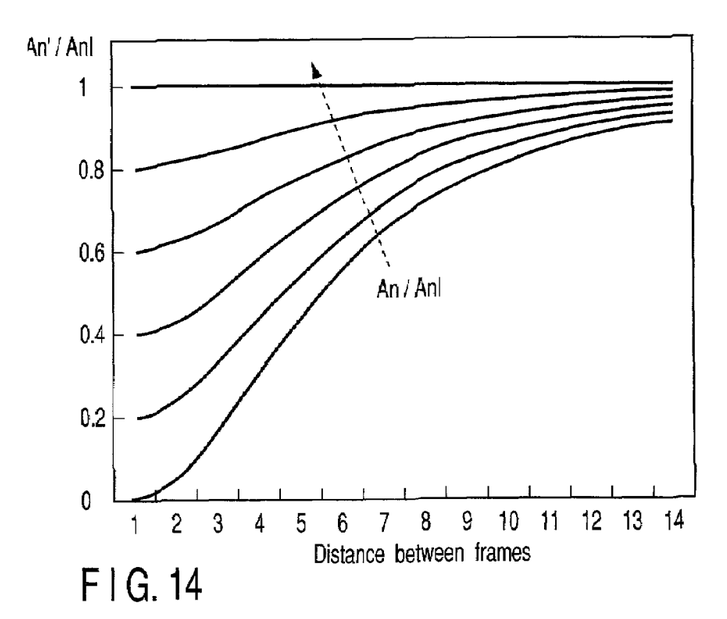
FIG. 14 shows a flowchart of a correction process of encoding property according to a frame skip in the embodiment.

FIG. 14 shows a graph indicating the property of the equation (2). The quadrature axis shows a distance between frames of a reference picture and a picture to be encoded (r+1), and the axis of ordinate shows a value obtained by normalizing the encoding property parameter An' after correction with $A_{nI}$. Further, the dashed arrow shows an incrementation direction of value $A_n/A_{nI}$ obtained by normalizing the encoding difficulty degree $A_n$ in the first encoding with $A_{nI}$. As understood from FIG. 14, the encoding property of a picture to be encoded approaches the encoding property of adjacent I picture as the distance between frames of the picture to be encoded and a reference picture increases.

By the above encoding property parameter correction process, it is possible to prevent degradation of evaluation precision of the encoding property even if the frame skip is used in the second encoding in order to satisfy a constraint of VBV, and it is possible to provide the number-of-bits allocation suitable for obtaining a stable high picture quality while satisfying a constraint of VBV.

According to the present invention as described above, at first, in the first encoding, an input video signal input in units of one frame is encoded with a constant frame rate, to generate statistical data including the number of generated bits every frame. At least one of the number-of-bits allocation and a quantization scale allocation and a frame skip allocation for each frame are determined according to this statistical data. Next, in the second encoding, the input video signal is encoded according to at least one of the number-of-bits allocation and quantization scale allocation and the frame skip allocation for each frame, to generate a bitstream as encoded data. As a result, the suitable number-of-bits allocation can be performed when encoding the video signal with a variable frame rate in the second encoding.

In the present embodiment, the input video signal is encoded over all frames with a constant frame rate without a frame skip in the first encoding. As a result, information of the number of generated bits for all frames is obtained. Therefore, the suitable frame skip allocation can be determined in the second encoding. At least one of the number-of-bits allocation and a quantization scale allocation is determined to encode the video signal with a variable bit rate in the second encoding.

In the present embodiment, since the second encoding is a variable bit rate encoding, at least one of the number-of-bits allocation and a quantization scale allocation for each frame is determined. Therefore, generation rate of a frame skip is suppressed in a minimum and variation of a picture quality can be eliminated by a synergistic effect of the variable bit rate encoding and the optimum arrangement of a frame skip.

A parameter of a function indicating a relation between the number of generated bits and quantization scale of each frame is estimated from statistical data in the second encoding, and the number-of-bits allocation is determined using the parameter. A temporal change of occupation quantity of a virtual receiving buffer is estimated using at least one of the number-of-bits allocation and quantization nothing scale which are determined, and also underflow of the virtual receiving buffer is estimated using the greatest quantization scale. In this case, the frame skip allocation is determined for the purpose of preventing the underflow of the virtual receiving buffer. When underflow of a virtual receiving buffer is estimated, a frame skip allocation of the frame gone up in time from the frame that underflow is estimated is determined.

According to the present embodiment, determination of a frame skip allocation is off-line processing, that is, the frame skip allocation is not determined in the second encoding. Otherwise, the number-of-bits allocation and frame skip allocation over the whole video sequence are determined after the first encoding, and then the second encoding is performed. Therefore, a frame skip allocation for a frame gone back in time from the frame that underflow of the virtual receiving buffer is predicted can be determined. Using this nature, the frame skip allocation is determined in order to minimize the number of frames skipped in succession so that a frame rate gradually decreases from a time dated back from a time point when the underflow of the virtual receiving buffer is predicted.

In the present embodiment, a model indicating a relation between the number of generated bits of the frame to be encoded and quantization scale is corrected according to the number of skipped frames, the number of generated bits of the skipped frame and an encoding type of a frame to be encoded next. As a result, precision of evaluating the number of generated bits in the second encoding can be improved and stable high picture quality encoding can be realized in the second encoding.

An encoding type can be selected every frame in the first encoding and the second encoding. The encoding type is coincided between the first encoding and the second coding for the same frame of an input video signal. As a result, prediction of the number of generated bits in the second encoding can be performed precisely.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding method for encoding a video comprising:

executing a first encoding for encoding an input video signal in units of one frame at a constant frame rate to generate statistical data including the number of generated bits for each frame;

determining at least one of an allocation of the number of
bits to each frame and an allocation of a quantization
scale to each frame over a whole sequence of the input
video signal, using the statistical data;
checking a condition of a video buffering verifier for each
frame subjected to the allocation of the number of bits;
determining a frame skip allocation for a frame to be
skipped when the condition of the video buffering
verifier is not satisfied; and
executing a second encoding for encoding a same input
video signal subjected to the first encoding, according
to at least one of the allocation of the number-of-bits
and the allocation of the quantization scale, and the
frame skip allocation to generate a bitstream.

2. A video encoding method according to claim 1, wherein
determining at least one of the allocation of the number of
bits and the allocation of the quantization scale includes:
estimating a parameter based on the statistical data, the
parameter being a parameter of a function indicating a
relation between the number of generated bits and the
quantization scale for each frame in the second encoding,
determining the allocation of the number-of-bits based on
the parameter,
determining the frame skip allocation including an estimating a temporal change of occupation quantity of a
virtual receiving buffer using at least one of the number-of-bits allocation and the quantization scale, and
determining the frame skip allocation to prevent underflow when the underflow of the virtual receiving buffer
is estimated using a greatest quantization scale.

3. A video encoding method according to claim 1, wherein
the first encoding and the second encoding includes:
selecting an encoding type for every frame, and
making the encoding type between the first encoding and
the second encoding for the same frame of the input
video signal coincide.

4. A video encoding method according to claim 1, wherein
determining at least one of the allocation of the number-of-bits and the allocation of the quantization scale includes
determining the allocation of the number of bits and the
allocation of the quantization scale so that the second
encoding encodes the video signal at a variable bit rate.

5. A video encoding method according to claim 4, wherein
the first encoding and the second encoding includes:
selecting an encoding type for every frame, and
making the encoding type between the first encoding and
the second encoding for the same frame of the input
video signal coincide.

6. A video encoding method according to claim 2, wherein
determining at least one of the allocation of the number of
bits and the allocation of the quantization scale includes;
estimating a parameter based on the statistical data, the
parameter being a parameter of a function indicating a
relation between the number of generated bits and the
quantization scale for each frame in the second encoding,
determining the allocation of the number-of-bits based on
the parameter,
determining the frame skip allocation including estimating a temporal change of occupation quantity of a
virtual receiving buffer using at least one of the number-of-bits allocation and the quantization scale, and
determining the frame skip allocation to prevent underflow when the underflow of the virtual receiving buffer
is estimated using a greatest quantization scale.

7. A video encoding method according to claim 6, wherein
the first encoding and the second encoding includes:
selecting an encoding type for every frame, and
making the encoding type between the first encoding and
the second encoding for the same frame of the input
video signal coincide.

8. A video encoding method according to claim 6, further
comprising:
correcting at least one of the allocation of the number-of-bits and the quantization scale by changing the
parameter of the function according to (a) the number
of frames that the frame skip is determined, (b) a
parameter of a function indicating a relation between
the number of generated bits and a quantization scale
for a skip determination frame determined as the frame
skip, and (c) an encoding type of a frame to be encoded
just after the skip determination frame, and wherein the
parameter of the function indicates a relation between
the number of generated bits and the quantization scale
of the frame to be encoded just after the skip determination frame.

9. A video encoding method according to claim 6, wherein
determining the frame skip allocation includes determining
a frame skip allocation for a frame dated back in time from
a frame from which he underflow is estimated.

10. A video encoding method according to claim 9,
wherein the first encoding and the second encoding includes:
selecting an encoding type for every frame, and
making the encoding type between the first encoding and
the second encoding for the same frame of the input
video signal coincide.

11. A video encoding method according to claim 9, further
comprising:
correcting at least one of the allocation of the number-of-bits and the quantization scale by changing the
parameter of the function according to (a) the number
of frames that the frame skip is determined, (b) a
parameter of a function indicating a relation between
the number of generated bits and a quantization scale
for a skip determination frame determined as the frame
skip, and (c) an encoding type of a frame to be encoded
just after the skip determination frame, and wherein the
parameter of the function indicates a relation between
the number of generated bits and the quantization scale
of the frame to be encoded just after the skip determination frame.

12. A video encoding method according to claim 11,
wherein the first encoding and the second encoding includes:
selecting an encoding type for every frame, and
making the encoding type between the first encoding and
the second encoding for the same frame of the input
video signal coincide.

13. A video encoding method for encoding a video by
encoding an input video signal a plurality of times, the
method comprising:
executing a first encoding for encoding an input video
signal at a constant bit rate;
generating statistical data including the number of generated bits for each frame in the first encoding;
determining at least one of the number of bits and a
quantization scale that are to be allocated to each frame
over a whole sequence of the input video scale, using
the statistical data;
checking a condition of a video buffering verifier for each
frame subjected to allocation of the number of bits;

determining a frame skip allocation for a frame to be skipped when the condition of the video buffering verifier is not satisfied;

executing a second encoding for encoding a same input video signal subjected to the first encoding, according to at least one of the number of bits and the quantization scale, and the frame to be skipped.

14. A video encoding method according to claim 13, wherein determining the at least one of the number of bits and the quantization scale includes determining the number of bits and the quantization scale so that the second encoding encodes the video signal at a variable bit rate.

15. A video encoding apparatus which encodes an input video signal, comprising:

an encoder configured to encode an input video signal in units of one frame at a constant frame rate to obtain statistical data including the number of generated bits for every frame;

a first determination part configured to determine at least one of an allocation of the number of bits and an allocation of a quantization scale for each frame over a whole sequence of the input video signal according to the statistical data;

a checker configured to check a condition of a video buffering verifier for each frame subjected to the allocation of the number of bits; and a second determination part configured to determine a frame skip allocation for a frame to be skipped when the condition of the video buffering verifier is not satisfied, wherein the encoder encodes a same input video signal subjected to encoding to obtain the statistical data, according to the frame skip allocation and at least one of the allocation of the number-of-bits and the allocation of the quantization scale, to output encoded video data.

16. A video encoding apparatus according to claim 15, wherein the first determination part includes:

a estimation part configured to estimate a parameter based on the statistical data, the parameter being a parameter of a function indicating a relation between the number of generated bits and the quantization scale for each frame in the second encoding, a determination part configured to determine the allocation of the number-of-bits based on the parameter, and the second determination part includes an estimation part configured to estimate a temporal change of occupation quantity of a virtual receiving buffer using at least one of the number-of-bits allocation and the quantization scale, and a determination part configured to determine the frame skip allocation to prevent underflow when the underflow of the virtual receiving buffer is estimated using a greatest quantization scale.

17. A video encoding apparatus according to claim 15, wherein the encoder includes:

a selection part configured to select an encoding type for every frame, and a coincidence part configured to make the encoding type between the first encoding and the second encoding for the same frame of the input video signal coincide.

18. A video encoding apparatus according to claim 15, wherein the first determination part includes a determination part configured to determine the allocation of the number of bits and the allocation of the quantization scale so that the second encoding encodes the video signal at a variable bit rate.

19. A video encoding program recorded on a computer readable medium, for encoding a video at least two times, the program comprising:

means for instructing a computer to encode an input video signal input in units of one frame at a constant frame rate to obtain statistical data including the number of generated bits for every frame;

means for instructing the computer to determine at least one of an allocation of the number-of-bits and an allocation of a quantization scale for each frame over a whole sequence of the input video signal according to the statistical data;

means for instructing the computer to check a condition of a video buffering verifier for each frame subjected to the allocation of the number of bits;

means for instructing the computer to determine a frame skip allocation for a frame skip when the condition of the video buffering verifier is not satisfied; and means for instructing the computer to encode a same input video signal subjected to encoding to obtain the statistical data, according to the frame skip allocation and at least one of the allocation of the number-of-bits, and the allocation of the quantization scale.

20. A video encoding program according to claim 19, further comprising:

means for instructing the computer to select an encoding type for every frame, and making the encoding type between the first encoding and the second encoding for the same frame of the input video signal coincide.

* * * * *